(12) United States Patent
Herd et al.

(10) Patent No.: US 7,946,409 B2
(45) Date of Patent: May 24, 2011

(54) SELF SERVICE TERMINAL

(75) Inventors: Stewart J. Herd, Perth & Kinross (GB); Alexander S. MacDonald, Dundee (GB)

(73) Assignee: NCR Corporation, Duluth, GA (US)

( * ) Notice: Subject to any disclaimer, the term of this patent is extended or adjusted under 35 U.S.C. 154(b) by 501 days.

(21) Appl. No.: 12/012,178

(22) Filed: Jan. 31, 2008

(65) Prior Publication Data

US 2009/0194387 A1      Aug. 6, 2009

(51) Int. Cl.
*F16H 1/16*         (2006.01)
*F16H 55/08*        (2006.01)

(52) U.S. Cl. ............................ 194/344; 74/425; 74/458

(58) Field of Classification Search .................. 74/411.5, 74/424.5, 427, 425, 457, 458, 462; 220/478, 220/479, 211
See application file for complete search history.

(56) References Cited

U.S. PATENT DOCUMENTS

| 632,875 | A | * | 9/1899 | Mase | 74/424.6 |
| 2,548,338 | A | * | 4/1951 | Behrens | 232/43.3 |

* cited by examiner

*Primary Examiner* — Stefanos Karmis
*Assistant Examiner* — Mark J Beauchaine
(74) *Attorney, Agent, or Firm* — Paul W. Martin

(57) ABSTRACT

A self service terminal having a slot; at least one shutter for selectively opening and closing the slot and a gear drive for moving the shutter between open and closed positions, the gear drive having a first gear that interacts with a second gear, at least one of the first and second gears defining a stop that is engagable with the other of the first and second gears to stop or prevent non-gear driven movement of the shutter.

8 Claims, 3 Drawing Sheets

SELF SERVICE TERMINAL

The present invention relates to a self service terminal, for example an automated teller machine, with a secure shutter for closing a dispensing slot.

BACKGROUND

Shuttered doors are often used to protect cash dispensing slots in automated teller machines. Various mechanisms are used to activate such shutters. One example is a worm drive. This has a screw-threaded rod that engages with a toothed cog that is attached to the shutter door. The threaded rod is rotatable in a clockwise or anticlockwise direction, the thread of the rod engaging the teeth of the cog to transfer rotation of the rod to the cog and thereby open or close the shutter.

A problem with known worm drive arrangements is that if an intruder tried to force open the closed shutter door of a cash dispensing slot, this would rotate the cog, the teeth of the cog pushing against the sloping threads of the rod in order to turn the rod and allow the shutter doors to be opened. To counter this, some prior art shutter operating mechanisms have separate locks, which engage with the drive.

SUMMARY OF INVENTION

According to a first aspect of the invention, there is provided a self service terminal having a slot, for example a cash dispensing slot; at least one shutter for selectively opening and closing the slot and a gear drive for moving the shutter between its open and closed positions, the gear drive having a first gear that interacts with a second gear; at least one of the first and second gears including an integrally formed stop, the stop being engagable with the other of the first and second gear to stop or prevent non gear-driven movement of the shutter.

According to another aspect of the invention, there is provided a gear drive comprising a first gear interacting with a second gear; at least one of the first and second gears being provided with a stop, engagable with the other of the first and second gear to stop the gears rotating.

Both the first and second gears may be provided with a stop. The stop of both first and second gears may interact together to stop the gears rotating.

The first gear may be a threaded screw. The second gear may be a toothed cog. The cog may be a curved member having teeth. The body of the curved member may be an arc around a virtual axis origin.

The gears may be shaped to define the stop. Where the first gear is a threaded screw and the second gear is a toothed cog, the stop may be a flatted section of the screw thread and/or a flatted face of a tooth of the cog.

Where one of the gears is a threaded screw, the stop may comprise a section of the thread in which at least one of its faces is substantially normal to the longitudinal axis of its shaft.

Where one of the gears is a toothed cog, the teeth may have engaging faces that are at a non-zero angle to a plane through the virtual axis origin of the cog and a central cross section of the tooth. The stop may comprise at least one engaging face angled substantially parallel to a plane through the virtual axis origin of the cog and central cross section of the tooth.

The teeth of the cog may be adapted to engage with the threads of the screw. The cog and thread may be adapted to interact so as to provide a force on each other in the direction of a pressure angle. The angle of the screw faces and the engaging faces of the teeth may mate in a drive position, where the pressure angle is non-zero, for example 20 degrees, and a locking position, where the pressure angle is substantially zero.

BRIEF DESCRIPTION OF DRAWINGS

Various aspects of the invention will now be described by way of example only and with reference to the accompanying drawings of which.

DETAILED DESCRIPTION OF THE DRAWINGS

Figure 1:
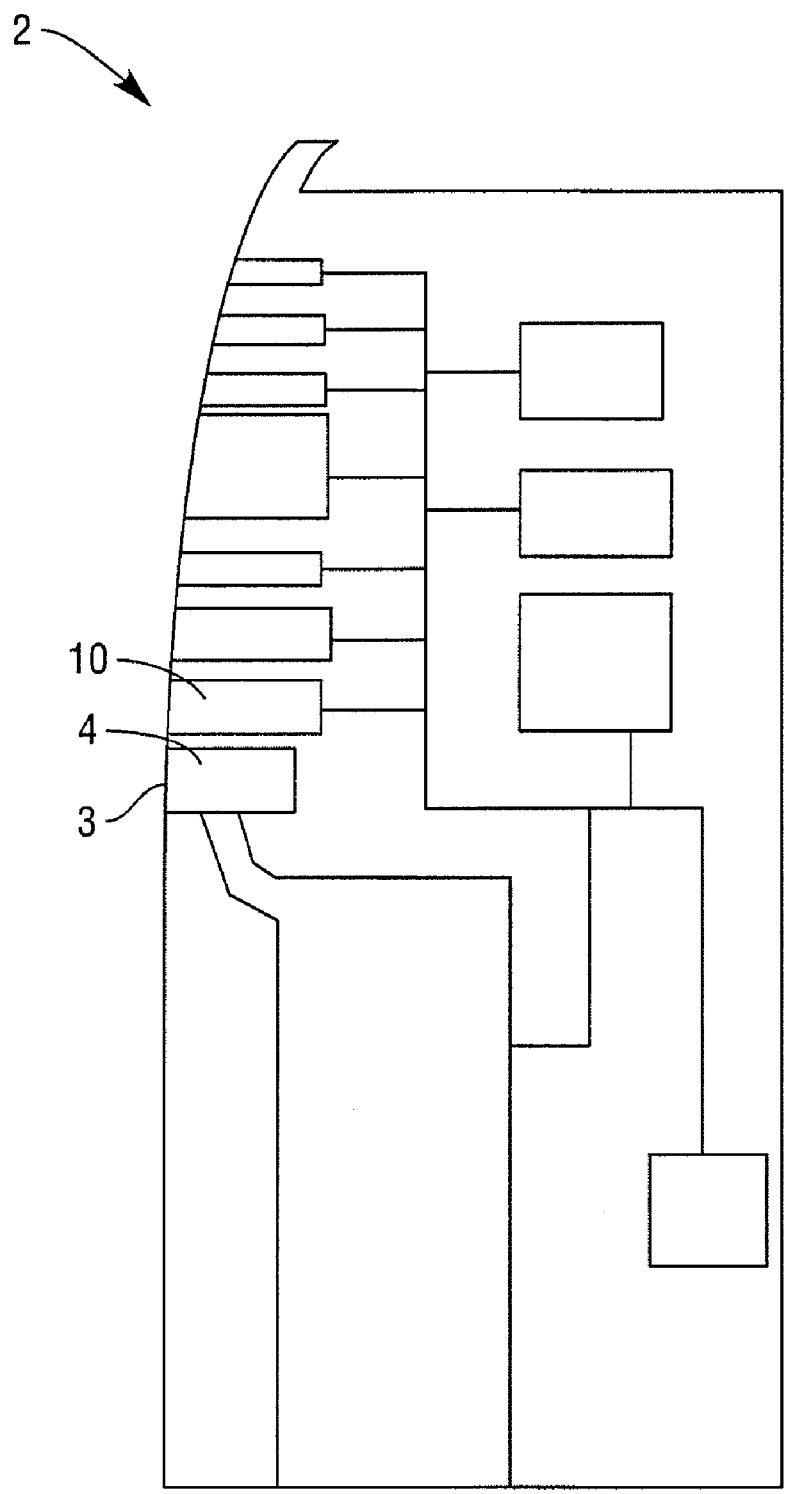
FIG. 1 shows a section through a self service terminal.

FIG. 1 shows an automated teller machine 2 that has a shutter 3 over a cash-dispensing slot 4. The shutter may have one or more shutter doors, and may be, for example, a universal shutter, although any suitable shutter design may be used. To move the shutter between an open and closed position, a worm drive mechanism 10 is provided. This is a coupled gear system in which the threads of a threaded screw are engaged with teeth of a toothed cog. The cog has a guide arm (not shown) that is coupled to the shutter, so that movement of the cog causes movement of the shutter between its open and closed position.

Figure 2:
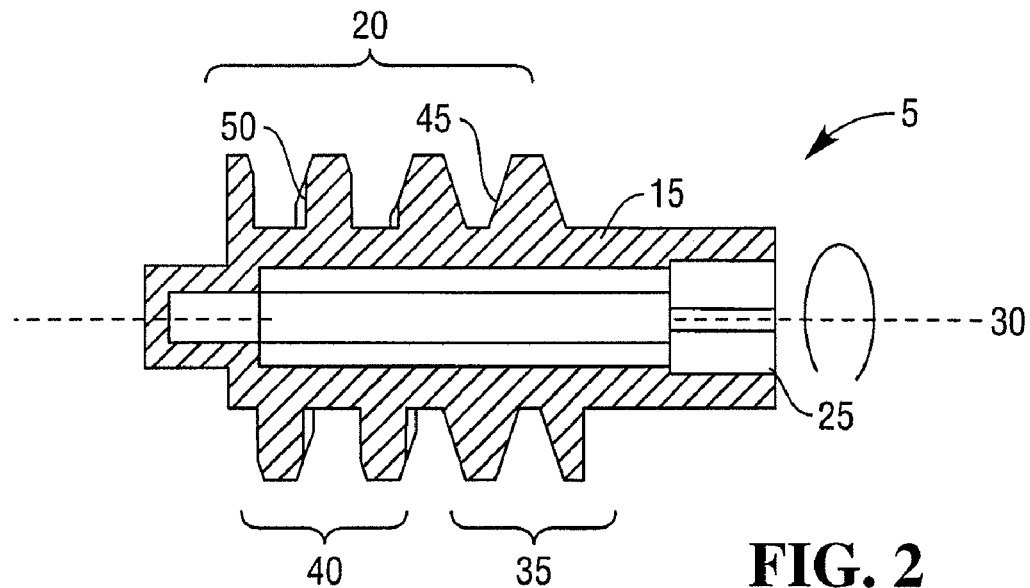
FIG. 2 shows a cross section of a screw for a worm drive.

FIG. 2 shows a screw 5 for the worm drive mechanism 10. This has a longitudinally extending shaft 15. At one end it has a thread 20 and the other end 25 a connection to a drive mechanism (not shown). In use, the screw is rotated by the drive around its longitudinal axis 30. The thread 20 extends from the shaft 15 in a generally radial direction and is provided in two sections 35, 40. In the first section 35, the thread 20 is helically coiled around the shaft 15 and extends radially outwardly from the shaft 15. The faces 45 of the thread 20 facing towards each end of the shaft 15 are obliquely angled to the radial axis of the shaft 15. Advantageously, the faces 45 of the thread lie at approximately 20° to the radial axis of the shaft 15. In the second section 40 of the thread 20, the faces of the thread 50 facing each end of the shaft 15 have been flattened such that they lie substantially normal to the longitudinal axis of its shaft.

Figure 3:
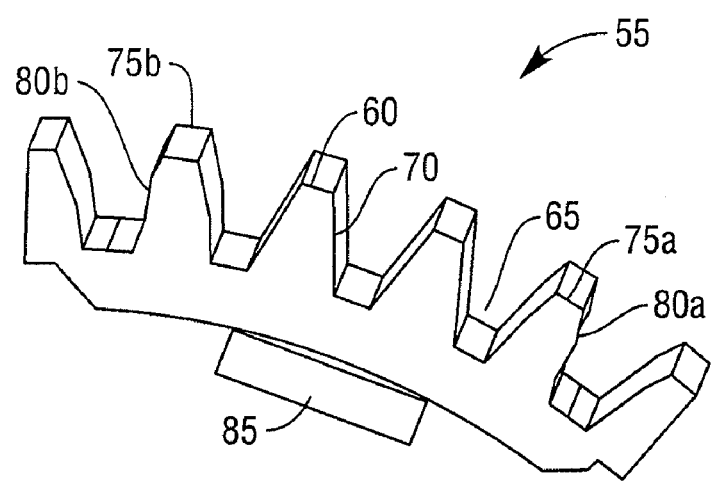
FIG. 3 shows a toothed cog of a worm drive, adapted to interact with the screw of FIG. 2.

FIG. 3 shows a toothed member 55 for use in conjunction with the screw 5 of FIG. 2. This is curved, defining an arc subtended by approximately a 40.5° angle. The toothed member is adapted to be moved around a virtual axis origin at the centre of the arc. The toothed member 55 has six teeth 60 separated by channels 65. The face 70 of each tooth that faces an adjacent tooth is angled to result, in use, in a pressure angle on the corresponding screw thread 20 of 20° to a plane through the virtual axis origin of the toothed member 55 and a central cross section of the tooth 60, apart from the second most outer teeth 75a, 75b. The face 80a, 80b of each of the second most outer teeth 75a, 75b facing the ends of the curved member 55 are flatted, such that they lie substantially parallel to a plane through the virtual axis origin of the toothed member 55 and a central cross section of the tooth 75a, 75b. The toothed member 55 has flanges 85 for fitting in a guide track, to guide movement of the toothed member 55 and move the shutter doors as the toothed member 55 is rotated around the virtual axis origin under the action of the screw 5.

Figure 4:
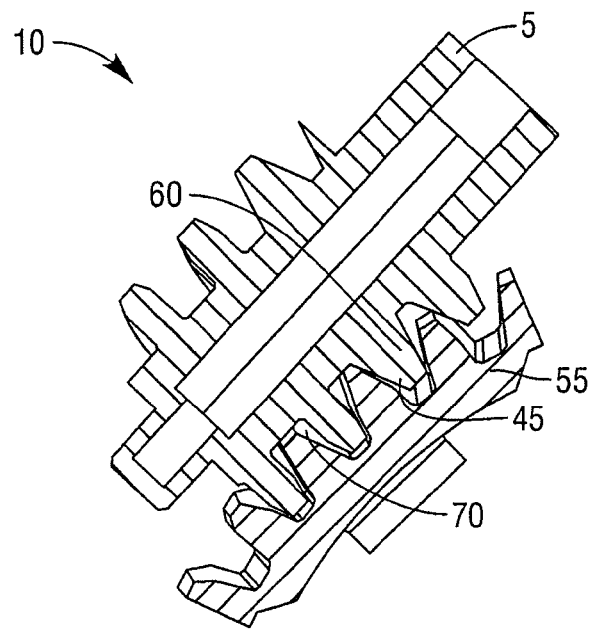
FIG. 4 shows the screw of FIG. 2 interacting with the cog of FIG. 3 in a drive position.

FIG. 4 shows the screw 5 and toothed member 55 engaging in a drive configuration, where the angled faces 70 of the inner teeth 60 engage an angled face of the thread 45 of the first section 35 of the screw 5. Rotation of the screw 5 around its longitudinal axis 30 results in the movement of the toothed member 55 around its virtual axis origin, with reversal of the direction of rotation of the screw 5 resulting in a corresponding reversal in the direction of movement of the toothed member 55.

Figure 5:
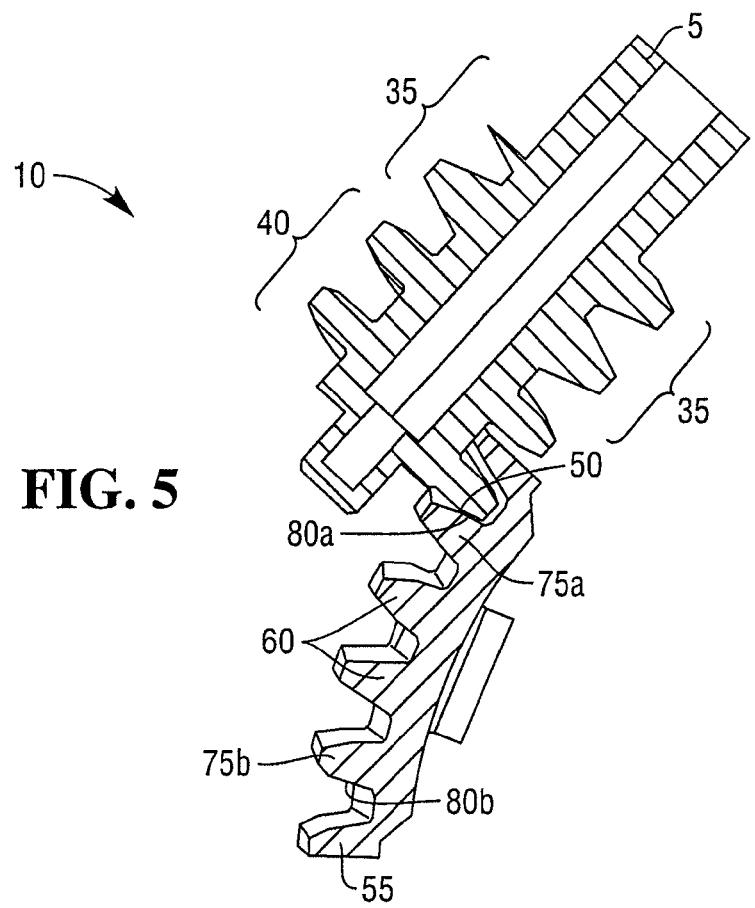
FIG. 5 shows the screw of FIG. 2 interacting with the cog of FIG. 3 in a locked position.

FIG. 5 shows the worm drive 10 in a locked configuration, which corresponds to a shut position of the shutter 90. In this configuration, at least part of the second section 40 of the screw thread 20 is in engagement with one of the flatted faces 80a, 80b of the toothed member 55. Thus, if an intruder tries to force the shutter doors apart, thereby applying a rotational force to the toothed member 55, the flattened face 80a of the toothed member 55 is forced against the flattened face 50 of the second section 40 of the thread 20 on the screw 5 at a pressure angle of 0° to the longitudinal axis of the screw 5. This pressure angle results in no turning motion on the screw 5, since the screw 5 is rotatable around the longitudinal axis 30 and there is no component of the force exerted in the direction of rotation of the screw 5. Thus, the flattened face 80a of the toothed member engages the flattened face 50 of the thread 20, preventing the toothed member 55 from turning any further. In order to release the lock, the drive turns the screw 5 and rotates the flatted second section 40 of the thread 20 out of engagement with the teeth 60, 75 of the toothed member 55 and causes the first section 35 of the thread 20 to engage with the teeth 60, 75 to rotate the toothed member 55.

By varying the shape of the thread of the screw along its length and varying the shape of at least one of the teeth of the toothed cog so that when they mate no rotational force can transferred from the cog to the screw shaft, there is provided a simple and yet effective mechanism for stopping or preventing movement of the shutter in the event that an external, i.e. non-gear driven, force is applied to the shutter. This is done without interfering with the basic functioning of the worm-drive, which can still be operated merely by rotation of the screw to cause the shutter to open or close as desired.

A skilled person will appreciate that variations of the disclosed arrangements are possible without departing from the invention. For example, whilst the toothed member is described above as curved, it could also be a toothed wheel or any other suitable arrangement. In addition, whilst the drive mechanism is described as requiring a 20° pressure angle, in practice, other non-zero pressure angles that result in rotation of the cog may be used. In the embodiment of a self service terminal, the worm-drive mechanism operates a shutter that is located above the dispensing slot. However, it will be appreciated that the shutter and/or the drive mechanism may be located in other positions, such as below the dispensing slot. Furthermore, whilst the toothed member of the worm drive is described as having six teeth, more or less teeth may be used.

Accordingly, the above description of the specific embodiment is made by way of example only and not for the purposes of limitation. It will be clear to the skilled person that minor modifications may be made without significant changes to the operation described.

What is claimed is:

1. A self service terminal comprising:
   a slot;
   at least one shutter adjacent the slot and selectively positionable between an open position and a closed position;
   a gear drive for moving the shutter between the open and closed positions, the gear drive having a first gear that interacts with a second gear, the first gear including a threaded screw gear and the second gear including a toothed member having teeth; and
   a first stop engageable with the second gear and a second stop engageable with the first gear to stop or prevent non gear-driven movement of the shutter;
   wherein the first and second gears are shaped to define the first and second stops; and
   wherein a portion of a thread of the screw gear is shaped to define the first stop and at least one tooth of the toothed member is shaped to define the second stop.

2. A self service terminal according to claim 1, wherein the stops interact to stop the first and second gears from rotating.

3. A self service terminal according to claim 1, wherein the first stop is a flatted threaded section of a screw of the screw gear and the second stop is a flatted face of the one tooth of the toothed member.

4. A self service terminal according to claim 3, wherein the first stop has a first section of the thread wherein faces of the first section are at a substantially non-zero angle to a normal to a longitudinal axis of the screw gear.

5. A self service terminal according to claim 4, wherein the first stop further comprises a second section of the thread wherein faces of the second section are substantially normal to the longitudinal axis of the screw gear.

6. A self service terminal according to claim 5, wherein the teeth of the toothed member have engaging faces that are at a non-zero angle to a plane through a virtual axis origin of the toothed member and a central cross section of the one tooth.

7. A self service terminal according to claim 6, wherein the second stop comprises at least one engaging face angled substantially parallel to the plane through the virtual axis origin of the toothed member and the central cross section of the one tooth.

8. A self service terminal according to claim 7, wherein the threaded faces of the screw and the engaging faces of the teeth are oriented such that, in a drive position, a pressure angle is non-parallel to the longitudinal axis of the screw gear and, in a stopping or locking position, the pressure angle is substantially parallel to the longitudinal axis of the screw gear.

* * * * *